United States Patent Office 3,375,837
Patented Apr. 2, 1968

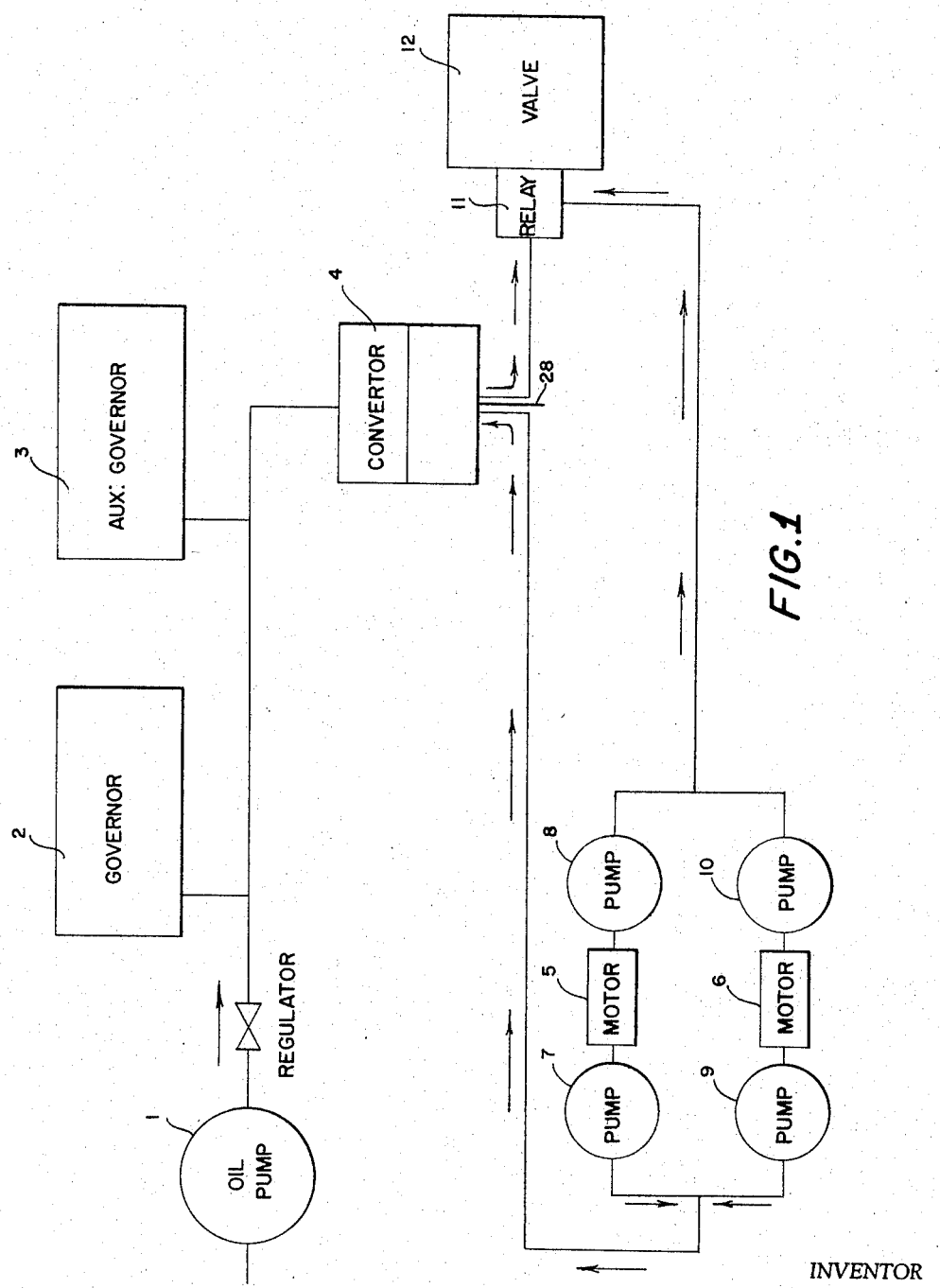

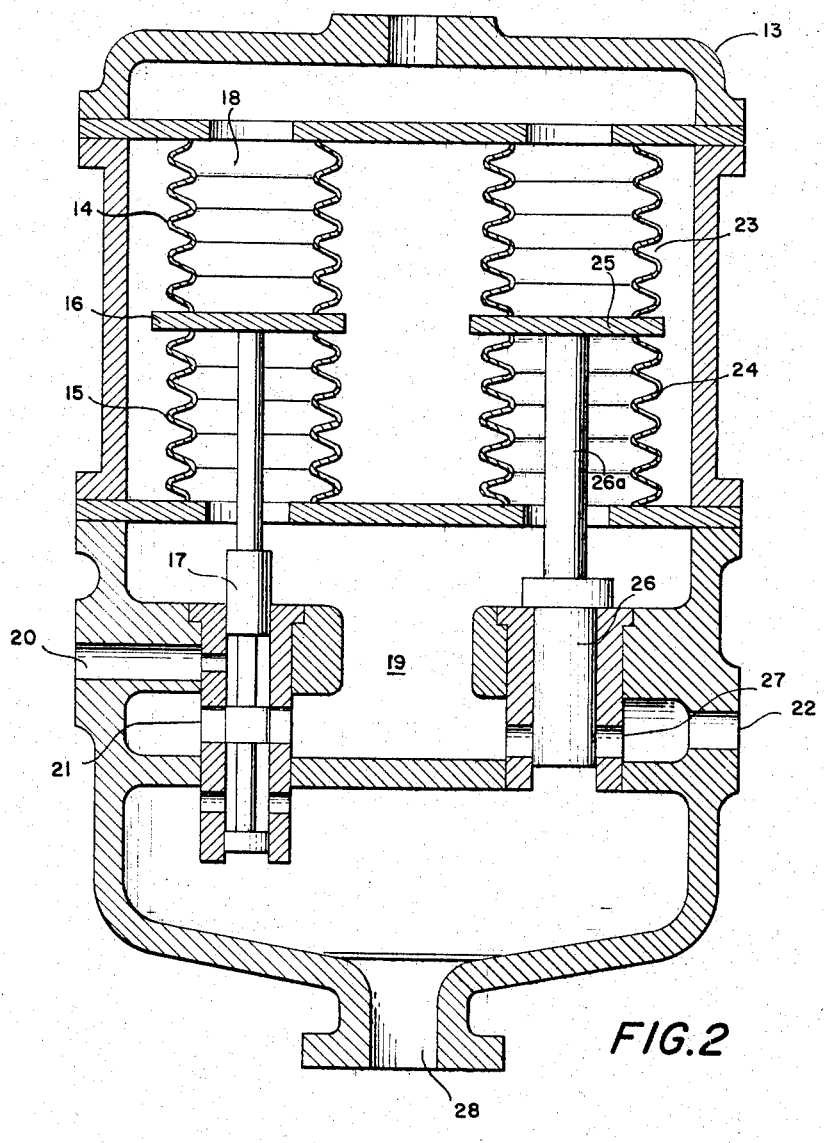

3,375,837
SPEED GOVERNING SYSTEM WITH CONVERTER DEVICE BETWEEN TWO SEPARATE FLUID CIRCUITS
William George Watson, Whitley Bay, England, assignor to C. A. Parsons & Company, Limited, Newcastle-upon-Tyne, England, a corporation of Great Britain
Filed May 20, 1965, Ser. No. 457,392
Claims priority, application Great Britain, May 20, 1964, 20,742/64
8 Claims. (Cl. 137—36)

ABSTRACT OF THE DISCLOSURE

A governing system for steam turbines in which an oil pump supplies one or more speed governors and metered oil from the governors passes to a pressure converter device. The pressure converter device is adapted to produce a pressure in a fire-resistant fluid proportional to the oil pressure. The fire-resistant fluid is used to operate system relays, valves, etc. and is, through the use of the pressure converter, kept separate from the oil to prevent contamination.

---

This invention relates to speed governing systems for steam turbines.

It is common practice to control the speed of large steam turbines such as those used in large electrical power stations by means of governing systems which are basically hydraulic systems. In such systems a main oil pump commonly supplies oil to the governing system and to the lubrication system of the machine. Additionally an electric generator or generators driven by the turbine may have oil operated shaft seals to prevent leakage of a cooling fluid such as hydrogen from the casing of the generator, in which case the main oil pump may also provide the oil for the shaft seals.

Typically the oil is used in the governing system to operate relays controlling the opening of governor valves, emergency stop valves, intercept valves, and other devices controlling the supply of steam to the turbine. Thus a typical basic system might include a centrifugal governor geared to the turbine shaft, and an oil pump which may also be geared to the shaft, mounted on the shaft itself, or motor-driven. The governor might operate a relay or pilot valve which would admit oil under pressure to a servomotor controlling the steam-governing valves.

The oil used is commonly a petroleum oil suitable for use as a lubricant and, if it is to be used for gas seals for an electrical generator, suitable also for use in an electrical machine. As turbine operating temperatures increase, the fire risk attendant upon a possible fracture of an oil line in the governing system increases, and it becomes desirable to use a fire-resistant fluid for operating the various relays in the governing system. In many cases, however, the properties of such fire-resistant fluids make them unsuitable as lubricants or for use in the gas seals of electrical generators.

The primary object of the instant invention is to provide speed governing systems for steam turbines wherein fire risk upon a possible rupture of the fluid lines is substantially reduced.

It is a further object of this invention to provide such a system which accomplishes the foregoing object while retaining the capability of lubricating and shaft sealing substantially as has been accomplished in the past.

It is a more specific object of this invention to provide a hydraulic governing system which permits the use of a fire-resistant fluid in certain parts of the system while still permitting the use of lubricating and sealing fluids in other parts of the system.

Toward accomplishing these objects, the invention comprises a governing system for steam turbines in which system an oil pump supplies oil to one or more speed governors driven by the turbine shaft, and metered oil from the governor or governors passes to a pressure converter device, which device is adapted to receive oil from the governor or governors and to produce a pressure in a fire-resistant fluid proportional to the oil pressure, the fire-resistant fluid being kept separate from the oil to prevent contamination thereby, the fire-resistant fluid being used to operate relays, valves, or the like, in the governing system. Thus the oil pump and the governor or governors will serve to maintain a supply of pressurized oil at pressures varying with the speed of the turbine, and the pressure converter device will function to vary the pressure of at least part of the fire-resistant fluid in accordance with variations in the pressure of the pressurized oil, the varying pressures of the fire-resistant fluid being impressed upon the steam entry valve to control the setting of the valve in accordance with variations in the speed of the turbine.

A more specific feature of the invention resides in the provision of two substantially separate circuits for the fire-resistant fluid, one of the circuits being a low pressure pilot fluid circuit which has its pressure controlled by the pressure converter device for operating relays in response to fluctuations in turbine speed, the other circuit being a relatively higher pressure power fluid circuit in which the fluid is used to actuate the steam entry valves or other steam controlling devices under the control of the relays.

Preferably the oil circulating pump and the pump or pumps for pressurizing the fire-resistant fluid are separate and independent, and according to a convenient arrangement the oil pump can be driven by the turbine while the fire-resistant fluid pump is driven independently of the turbine.

Finally, important features of the invention reside in the structure and manner of operation of the pressure converter device, this device comprising generally a casing divided into two compartments by a flexible diaphragm or bellows arrangement, oil from the governor being passed to one compartment and fire-resistant fluid to the other compartment, the flexible diaphragm or bellows acting on a plunger controlling a valve which in turn controls the supply of fire-resistant fluid through the device, the arrangement being such that displacement of the plunger from a neutral position as a result of a change in the pressure of the oil supplied to the device operates the valve to connect the supply of fire-resistant fluid to a drain or to the valve relays or valves in the governing system or to cut-off the supply and open the relays to drain.

Other and further objects, advantages and features will be apparent to those skilled in the art from the following description of an exemplary embodiment of the invention taken with reference to the accompanying drawings wherein:

FIGURE 1 shows in a highly schematic and diagrammatic form the general elements of a governing system in accordance with one form of the present invention, and FIGURE 2 is a section view through a converter device of the type shown in FIGURE 1.

Referring to FIGURE 1 of the drawings, a governing system for a steam turbine plane for power station use is shown. Only the elements of the governing system itself are shown since their cooperation with other elements such as the turbine and electrical generators will be well known to those skilled in the art. An oil pump 1, which conveniently can be driven from the turbine shaft, supplies oil under pressure to main governor 2 and auxiliary governor 3, from which the oil is passed to pressure converter device 4. As previously pointed out, the oil pump 1 may also supply oil for lubrication purposes and for shaft sealing purposes for the turbine or turbines and electrical generators in the overall power plant. The piping or ducting arrangement is such that the governor 2 and the auxiliary governor 3 are connected in parallel with each other and are both in series with the pressure converter device 4. The oil pump and the governor can be of any well known type, and numerous suitable models are readily available commercially. Preferably the oil pump supplies oil at constant pressure to the governor or governors, and well known regulators can be used in circuit with the pump for this purpose if necessary. The governors receive the pressurized oil from the oil pump and vary the pressure of the oil which is passed to the converter in accordance with fluctuations in the speed of the turbine of the system, all of which is well known to those skilled in the art.

Electric motors 5 and 6 each drive two pumps circulating a fire-resistant fluid. Motor 5 drives pumps 7 and 8, pump 7 being for low pressure pilot fluid and pump 8 being for relatively higher pressure power fluid. Motor 6 drives pump 9 for low pressure pilot fluid and pump 10 for high pressure power fluid. Pumps 7 and 9 are connected in parallel, and pumps 8 and 10 are likewise connected in parallel. By driving the pumps for fire-resistant fluid independently of the turbine greater freedom in the layout of pump equipment is obtainable, and the provision of separate circuits for oil and fire-resistant fluid is facilitated.

A hydraulically actuated steam governor valve is indicated schematically at 12 in FIGURE 1, and a relay for controlling the supply of actuating fluid to the hydraulically actuated valve 12 is indicated schematically at 11. The low pressure pilot fluid (around 100 p.s.i.) passes to converter 4 wherein it is kept separated from the oil from governors 2 and 3, and this low pressure pilot fluid then passes to relay 11 of governor valve 12 as regulated by the pressure converter device 4. The relay operates in response to pressure changes in the pilot fluid to control the flow of power fluid used to operate the governor valve. The power fluid may be at a pressure of around 1000 pounds per square inch. The governor or governors detect changes in speed of the turbine and alter the pressure of the oil passing through the governors accordingly, and this pressure change is transferred to or impressed upon the fire-resistant fluid in converter 4, the resulting pressure changes in the pilot fluid actuating the relay 11. While a steam governor valve is illustrated in FIGURE 1, it will be recognized that other steam control devices can be included in the system, such as intercept valves which are usually confined to plants using reheat, emergency stop valves, vacuum unloading devices, and emergency trip devices, all of which are well known in the art.

With the arrangement described the components of the system which are in hot regions of the plant are operated by a fire-resistant fluid and are situated so that the risk of contamination by oil is substantially eliminated. In practice the pilot oil converter 4 is preferably placed adjacent the governors and main oil pump 1, and precautions are taken so see that the whole of the oil system is adequately shielded from hot portions of the plant. The use of a fire-resistant fluid enables high fluid pressure to be used in the power fluid circuit, and this naturally results in comparatively small and compact relays for operating the valves. A suitable fire-resistant fluid is phosphate-ester fluid, for example, Petrofina Hydran F.R. 32.

Referring to FIGURE 2, the converter 4 comprises a casing 13 in which are located two bellows 14 and 15 mounted "back to back" with a common floating base plate 16. Connected to base plate 16 is a plunger 17. Pressurized oil from the governor or governors is admitted to the space 18 inside bellows 14 from the opening in the top of the casing, and pilot fluid from the pumps 7 and 9 is admitted through inlet 20 and valve controlled ports 21 to space 19 which communicates with the inside of bellows 15 and also with the valve relays through outlet 22. Under steady loads on the turbine the plunger 17 is in the neutral position shown in FIGURE 2. In this position the pilot oil and fluid pressures in spaces 18 and 19, respectively, balance each other, and no flow of pilot fluid through the converter or release of fluid to drain from the converter takes place. Under these conditions the pressure of the fluid in the pump supply to the converter is higher than that prevailing in the fluid in the relay system.

If the pilot oil pressure from the governors increases, the plunger 17 moves downwardly allowing pilot fluid to flow through the converter from supply inlet 20 through ports 21 into space 19 and thence through outlet 22 to the relays operating the governor valves, such as relay 11 and governor 12. The pilot fluid pressure in space 19 and in the relays now increases and acts to vary the opening of the governor valves and maintain the turbine speed within predetermined limits. When the pressure of the pilot fluid has increased sufficiently so that it balances the pilot oil pressure, the plunger 17 will be restored to its neutral position. Conversely, a reduction of pilot oil pressure causes the plunger 17 to move upwardly and release pilot fluid in space 19 to drain through ports 21 and outlet 28. The pilot fluid pressure in space 19 now falls until it balances the pilot oil pressure and the plunger 17 is restored to its neutral position.

It is usual, though by no means essential, to arrange turbine governing systems such that a fall in turbine speed produces an increase in pilot oil pressure from the governors, in which event the downward movement of plunger 17 will act to increase the pilot fluid pressure, which in turn acts through the relays to increase the quantity of steam admitted to the turbine. Likewise a fall in pilot oil pressure usually corresponds to an increase in turbine speed, and the fall in pilot fluid pressure will act through the relays to reduce the quantity of steam admitted to the turbine. To reduce the response time of the system to a rise in turbine speed, a second pair of bellows 23 and 24 may be included in "back to back" relationship, bellows 23 being in communication with space 18 and bellows 24 with space 19. The bellows 23 and 24 have a common floating base plate 25 to which is attached by a stem 26a a plug valve 26. This valve 26 controls ports 27 which release pilot fluid in space 19 to drain through outlet 28. The cross-section of valve 26 or valve stem 26a is such that the effective inlet area to the bellows 24 is less than the inlet area to the bellows 23. Valve 26 is normally held down against a stop with the ports 27 closed, and on a sudden reduction of pilot oil pressure the pressure in bellows 23 falls more rapidly than in bellows 24. Accordingly the plunger of valve 26 rises quickly to open ports 27 and hence reduce the pilot fluid pressure in space 19 and in the valve relays. This in turn reduces the power fluid supplied to the valves, and they move rapidly toward the closed position.

The operation of the overall device will be readily apparent to those skilled in the art from the foregoing description. In essence, fluctuations in turbine speed are translated by the governor or governors into variations in the pressure of the oil which is transmitted to converter 4. The converter device 4 in turn translates the variations in oil pressure into corresponding variations in the pressure of the pilot fluid in the converter device and in the relays. These latter pressure variations actuate the relays and thus vary the supply of power fluid to the governor valve or valves. Ordinary pressure changes are compensated by bellows 14 and 15 and plunger valve 17, whereas an abrupt speed increase, or pressure drop, results in substantially complete unloading of the relay system by valve 26 through ports 27 and 28.

It will be readily apparent to those skilled in the art that numerous variations and modifications of the described and illustrated exemplary embodiment may be effected without departing from the scope and spirit of the invention. Accordingly, it should be understood that the specific embodiment illustrated and described herein is to be taken only as exemplary of the invention and is not to be considered as limiting in any sense. Rather the scope of the invention is as defined in the subjoined claims.

Having fully described my invention in the manner required by the patent statutes, I claim:

1. A speed governing system for steam turbines comprising at least one turbine driven speed governor, at least one hydraulically actuated entry valve for controlling the steam admitted to the turbine, circuit means supplying oil at constant pressure to said speed governor to be metered thereby in response to speed changes of the turbine, separate circuit means supplying a fire-resistant fluid to actuate said entry valve, and a pressure converter device having a compartment in the governor oil circuit and a compartment in the fire-resistant fluid circuit and having means for transmitting changes in pressure in the oil from said governor to the fire-resistant fluid controlling said entry valve.

2. A speed governing system for steam turbines as claimed in claim 1, wherein the fire-resistant fluid circuit comprises two sub-circuits, one being a low pressure pilot fluid circuit which includes a compartment of the pressure converter and which is used to operate relays in the valve in response to changes in turbine speed, and the other being a high pressure power fluid circuit which bypasses the pressure converter and in which the fluid is used to actuate the valves under the control of the relays.

3. A speed governing system as claimed in claim 1, in which said fire-resistant fluid is circulated by pump means driven independently of the turbine.

4. A speed governing system as claimed in claim 1, wherein the preessure converter device comprises a casing, two bellows mounted end to end within the casing, the adjacent ends of the two bellows being free to move and the other ends being fixed to the casing, a plate member separating the free adjacent ends of the bellows, to which plate member said free ends are attached, a plunger attached to said plate member, a ported valve member in which said plunger moves to control the opening of the ports therein, said ported valve member controlling the flow of fire-resistant fluid through the pressure converter device, means connecting the inside of one bellows to oil in the governor oil circuit and means connecting the inside of the other bellows to fire-resistant fluid in the fire-resistant fluid circuit downstream of said ported valve whereby a difference in pressure between the oil in one bellows and the fire-resistant fluid in the other causes movement of the plunger and hence varies the opening of the ports in the ported valve member to vary the pressure in the fire-resistant fluid circuit.

5. A speed governing system as claimed in claim 1, wherein the pressure converter device comprises a casing, two bellows mounted end to end within the casing, the adjacent ends of the two bellows being free to move and the other ends being fixed to the casing, a plate member separating the free ends of the bellows, to which plate member said free ends are attached, a plunger attached to said plate member, a ported valve member in which said plunger moves to control the opening of the ports therein, said ported valve member controlling the flow of fire-resistant fluid through the pressure converter device, means connecting the inside of one bellows to oil in the governor oil circuit and means connecting the inside of the other bellows to fire-resistant fluid in the fire-resistant fluid circuit downstream of said ported valve member whereby a difference in pressure between the oil in one bellows and fire-resistant fluid in the other causes movement of the plunger and hence varies the opening of the ports in the ported valve member to vary the pressure in the fire-resistant fluid circuit, a second pair of bellows mounted end to end within said casing, the adjacent ends of the two bellows being free to move and the other ends being fixed to the casing, a second plate member separating the free ends of said second pair of bellows and to which said free ends are fixed, a stem of a plug valve attached to said second plate member, said valve controlling a communicating passage from the fire-resistant fluid circuit to an area of relatively low pressure, means connecting oil in the governor circuit to the inside of one of said second pair of bellows, and means connecting fluid from the fire-resistant fluid circuit downstream of the said ported valve member to the inside of the other bellows of said second pair, whereby upon a sudden reduction in oil pressure in the governor oil circuit the piston valve connects the fire-resistant fluid circuit to a low pressure source.

6. In a steam turbine plant, a steam turbine, steam valve means for controlling the flow of steam to said turbine, an oil pump, a pressure converter device, governor means drivably connected to said turbine and in fluid communication with said oil pump and said pressure converter device for passing pressurized oil to said pressure converter device at varying pressures dependent upon the rotational speed of said turbine, and means for communicating a pressurized fire-resistant fluid through said pressure converter device to said steam valve means to control the setting of said valve means, said pressure converter device comprising means for regulating the pressure of said fire-resistant fluid in accordance with pressure changes in the pressurized oil in the converter device while maintaining the oil and fluid separated from each other.

7. In a steam turbine system, a steam turbine, valve means for controlling the supply of steam to said turbine, means for maintaining a volume of pressurized oil at pressures varying with the speed of said turbine, means for supplying pressurized fire-resistant fluid to said valve means to control the setting of the valve means, and pressure converter means for varying the pressure of at least part of said fire-resistant fluid in accordance with variations in the pressure of said pressurized oil.

8. Apparatus as set forth in claim 7 wherein said means for supplying pressurized fire-resistant fluid to said valve means comprises means for supplying a first fire-resistant pilot fluid at relatively low pressure and a second fire-resistant power fluid at relatively high pressure, and wherein said valve means comprises a hydraulically actuated valve and a relay controlling the supply of actuating hydraulic fluid, said low pressure pilot fluid serving to operate said relay which in turn controls the supply of high pressure fluid to said valve.

References Cited

UNITED STATES PATENTS

| | | | |
|---|---|---|---|
| 920,774 | 5/1909 | Nelson | 137—37 X |
| 1,697,399 | 1/1929 | Meyer | 137—100 X |
| 1,760,421 | 5/1930 | Luthi | 137—36 |
| 1,814,631 | 7/1931 | Ray | 137—36 |
| 2,280,128 | 4/1942 | Price | 137—37 X |
| 2,645,240 | 7/1953 | Drake | 137—100 |
| 2,953,151 | 9/1960 | Snyder | 137—100 |

CLARENCE R. GORDON, *Primary Examiner.*